June 3, 1924.

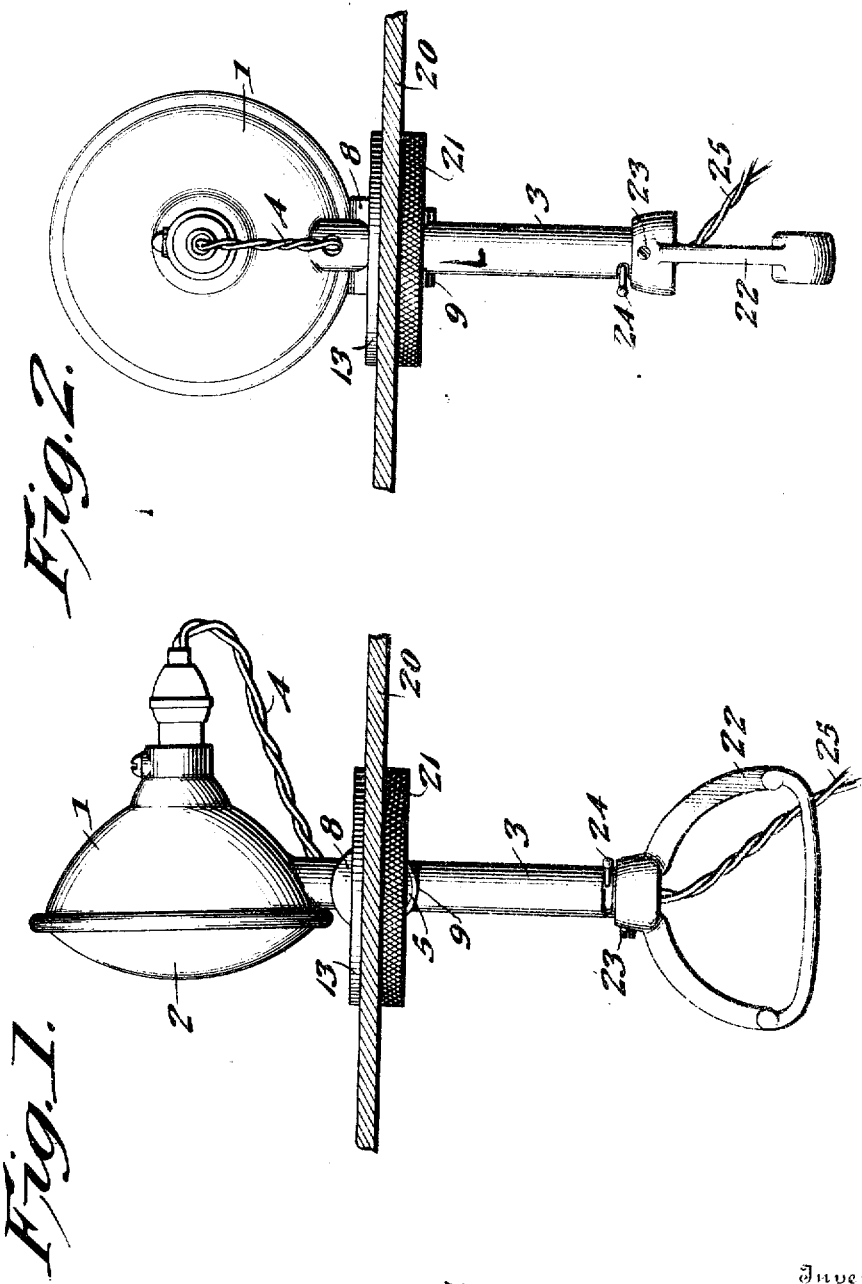

H. E. VANDERVEER

SPOTLIGHT MOUNTING

Filed Nov. 10, 1921

Inventor
H. E. Vanderveer
By Lloyd W. Patch
his Attorney

Patented June 3, 1924.

1,496,689

UNITED STATES PATENT OFFICE.

HERBERT E. VANDERVEER, OF PUEBLO, COLORADO.

SPOTLIGHT MOUNTING.

Application filed November 10, 1921. Serial No. 514,319.

*To all whom it may concern:*

Be it known that I, HERBERT E. VANDERVEER, resident of Pueblo, in the county of Pueblo, and State of Colorado, citizen of the United States, have invented certain new and useful Improvements in Spotlight Mountings, of which the following is a specification.

My present invention pertains to spotlights, and relates particularly to a spotlight adapted to be mounted on the top of a vehicle and to be shifted to direct the light rays at different angles as particular points are to be illuminated.

The primary object of this invention is to provide a spotlight structure which can be applied on the top of an enclosed automobile or other vehicle, when the vehicle is being built or by individual users, without the service of a skilled mechanic or the use of special tools, and which has manually actuatable shifting means extending into the body of the vehicle.

A further object lies in providing a universal joint, substantially at the point of mounting of the structure with the vehicle top, to thus permit the light casing to be turned on a vertical axis to the right and left and rocked on a horizontal axis to direct the light rays at an angle upwardly or downwardly from the horizontal.

Another object is to so construct the parts that adjustments can be made to vary the frictional bearing of the moving parts to hold adjustments to which the light casing is shifted and retain the parts against casual movement.

With these and other objects in view which will be apparent from the drawings, specifications and claims, this invention includes certain novel features of construction and combinations of parts which will now be set forth.

In the drawings:

Figure 1 is a view in side elevation of a spotlight structure made up according to my invention and showing the mounting on a vehicle top.

Fig. 2 is a rear elevation of the structure in Fig. 1.

Figure 3:
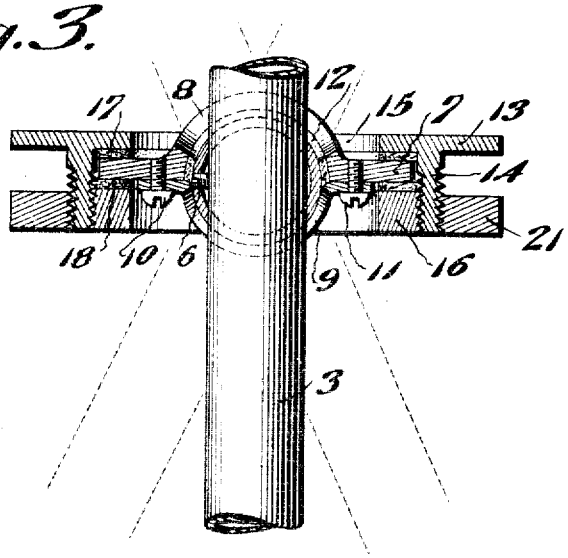
Fig. 3 is a vertical sectional view through the universal joint.

The light casing 1 is made of any desired form and has the usual lens or glass 2. This light casing is secured on the upper end of a tubular stem 3, and a wire 4 connected with an electric lamp bulb within the light casing is led down through this tubular stem.

A horizontal bearing member 5 is provided with an opening to receive tubular stem 3 and is held in place thereon below the light casing 1 by the set screw 6. A bearing ring 7 has bearing portion 8 provided to receive bearing member 5, and a mating bearing portion 9 is held in place upon the bearing ring by screws 10 and 11. The bearing portions 8 and 9 are slotted to permit the stem to be rocked, and a washer or lining 12, of felt or other suitable material, is disposed between the bearing member 5 and bearing portion 8.

Figure 4:
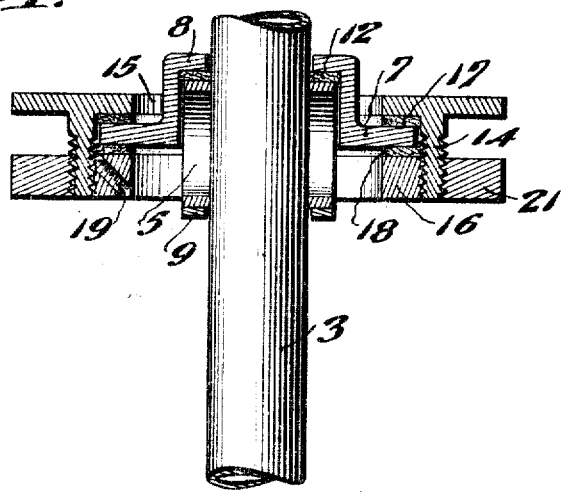
Fig. 4 is a sectional view through the joint taken at right angles to the disclosure in Fig. 3.

A mounting ring 13 is provided with an internally and externally threaded flange 14, of sufficient inside diameter to receive bearing ring 7, and the central opening 15 of this mounting ring is sufficiently large to clear bearing portion 8. A ring nut 16 is threaded to fit the internal threads of flange 14, and the parts are assembled as shown in Figs. 3 and 4 with packing washers 17 and 18 above and below bearing ring 7 and ring nut 16 tightened sufficiently against the washer 18 to secure a proper frictional bearing of the packing washers to maintain the settings of the parts when adjusted. Set screw 19 is provided to retain the ring nut in its settings.

The structure, as described, is mounted on a vehicle top portion as indicated at 20 in Figs. 1 and 2, an opening being cut in the top of sufficient size to receive threaded flange 14. Any packing or weather proofing material can be placed between the mounting ring 13 and the top 20, and the mounting ring is held in the desired position by a knurled clamping nut 21 which is screwed onto threaded flange 14.

A D-shaped or other suitable form of handle 22 is mounted on the lower end of stem 3 and held in place by a screw 23. If desired an electric switch of any suitable type, of which there are several on the market, can be mounted in the lower end of tubular stem 3 to be operated by lever 24. The wire or cable 25 is provided to give connection with a battery or other source of electric current supply.

In use my improved spotlight is assembled and mounted as shown, the mounting being positioned to dispose the handle 22 to be conveniently accessible to an occupant of the vehicle. Switch lever 24 is operated to throw in and cut out the lamp bulb within the light casing. By grasping handle 22 the operator can turn the light casing on a vertical axis with ring 7 as a bearing, and can rock the casing on a horizontal axis with member 5 as the bearing. Adjustments of the frictional contact at the bearings is accomplished through ring nut 16 and screws 10 and 11, and the packing material at 12 and 17 establishes a water tight and weather proof connection to prevent leakage around the bearings.

While, in the foregoing, I have described specific embodiments, and have mentioned only certain possible modifications, it will be appreciated that in practice I do not limit myself to such specific details as herein set forth, but may resort to any practical modifications falling within the scope of the invention as defined in the appended claims.

I claim:

1. A spotlight to be mounted through an upper portion of a vehicle having an opening therethrough comprising a bearing member, means to support the bearing member for turning movement within the opening, said bearing member having a central bearing opening, a second bearing mounted for turning movement within the bearing opening, a spotlight casing carried by said second bearing member on one side of the portion of the vehicle, and an operating handle on the opposite side.

2. A spotlight to be mounted through an upper portion of a vehicle having an opening therethrough, comprising a bearing member mounted within the opening substantially in the plane of the portion of the vehicle, a second bearing member carried by the first bearing member in substantially the same plane mounted for turning movement with respect to the first bearing member, and a spotlight carried by said second bearing member having a light casing on one side of the portion of the vehicle and a handle on the opposite side.

3. A spotlight mounting for use in mounting a spotlight on the upper portion of a vehicle having an opening therethrough comprising a bearing member mounted in the opening substantially in a plane with the portion of the vehicle and movable with respect thereto, a second bearing member carried by the first bearing member and mounted for movement independently with respect to the first bearing member, a stem carried by said second bearing member, a light casing carried on one end of said stem, and a handle on the opposite end of the stem.

4. In combination a support having an opening, a spotlight mounting adapted for universal movement fitted in the opening, the mounting comprising two bearing members one independently rotatable and the two connected to rotate in unison on an axis perpendicular to the axis of the independently rotating member, and a spotlight structure carried by the last named member and having a light casing on one side and a manipulating handle on the other side of the support.

5. In combination with the upper portion of a vehicle having an opening therethrough, a spotlight, a dirigible mounting for said spotlight in said opening comprising two bearing members one independently rotatable and the two mounted to rotate in unison within the opening on an axis at an angle to the axis of the independently rotatable member the spotlight having a light emitting portion on one side of said portion of the vehicle and operating means on the other side.

6. In combination with the upper portion of a vehicle having an opening therethrough, a bearing member mounted within the opening, means to support the bearing member for turning movement within the opening, a second bearing member carried by the first bearing member movable with respect thereto and carried by movement of the first bearing member, and a spotlight carried by the second bearing member presenting a light casing on one side of the portion of the vehicle and an operating handle on the other side.

7. A spotlight mounting for use with the upper portion of a vehicle having an opening therethrough comprising a bearing member, a mounting ring by which the bearing member is mounted for revoluble movement within the opening, a second bearing member having rocking mounting in the first bearing member and movable independently on a transverse axis, and a spot light carried by said second bearing member presenting a light casing on one side of the portion of the vehicle and a handle on the opposite side.

8. In combination with a spotlight, a spotlight mounting for use on closed vehicles comprising a mounting ring, a bearing ring rotatably mounted within the mounting ring, a rocking bearing portion formed on said bearing ring, a light casing, a stem by which said light casing is carried, a bearing member mounted on the stem received in the bearing portion of the bearing ring, and a mating bearing portion by which the bearing member is mounted in place.

9. In combination with a spotlight, a spotlight mounting for use on closed vehicles comprising a mounting ring, a bearing ring rotatably mounted within the mounting ring, a rocking bearing portion formed on said bearing ring, a light casing, a stem by which said light casing is carried, a bearing member mounted on the stem received in the bearing portion of the bearing ring, a mating bearing portion by which the bearing member is mounted in place, and frictional means by which the bearing ring and bearing portion are held in adjusted positions.

10. In combination with a spotlight, a spotlight mounting for use on closed vehicles comprising a mounting ring, a bearing ring rotatably mounted within the mounting ring, a rocking bearing portion formed on said bearing ring, a light casing, a stem by which said light casing is carried, a bearing member mounted on the stem received in the bearing portion of the bearing ring, a mating bearing portion by which the bearing member is mounted in place, frictional means by which the bearing ring and bearing portion are held in adjusted positions, and means by which the frictional bearing can be varied.

11. In combination with a spotlight, a spotlight mounting for use on closed vehicles comprising a mounting ring, a bearing ring rotatably mounted within the mounting ring, a transversely disposed rocking bearing member carried by the bearing ring, said spotlight being carried by said second bearing member and having a light casing on one side of the mounting ring and a handle on the other side, frictionally engaging means carried by the mounting ring to retain adjustments of the bearing ring, and friction means to retain adjustments of the second bearing member.

12. In combination a support having an opening therethrough, a spotlight mounted for universal movement in the opening, the mounting comprising two bearing members one independently rotatable and the two connected to rotate in unison on an axis at an angle to the axis of the independently rotatable member, the spotlight being carried by the independently rotatable bearing member and having a lamp casing on one side and a maninplating handle on the other side of the support, and frictional means by which the two bearing members are held in adjusted positions.

In testimony whereof I hereunto affix my signature.

HERBERT E. VANDERVEER.